United States Patent

Flanagan

[15] 3,662,108

[45] May 9, 1972

[54] APPARATUS FOR REDUCING MULTIPATH DISTORTION OF SIGNALS UTILIZING CEPSTRUM TECHNIQUE

[72] Inventor: James Loton Flanagan, Warren, N.J.

[73] Assignee: Bell Telephone Laboratories, Incorporated, Murray Hill, N.J.

[22] Filed: June 8, 1970

[21] Appl. No.: 44,269

[52] U.S. Cl. ............................179/1 SA, 325/304, 325/305, 325/65

[51] Int. Cl. ............................................................G10l 1/00

[58] Field of Search ....................179/1 SA, 1 J, 1 P, 15.55 R; 324/77 E, 77 F, 77 B; 325/305, 65, 304, 40, 56

[56] References Cited

UNITED STATES PATENTS 3,542,954 11/1970 Flanagan................................179/1 J 3,566,035 2/1971 Noll.....................................179/1 SA 3,360,610 12/1967 Flanagan..............................179/1 SA

*Primary Examiner*—Kathleen H. Claffy

*Assistant Examiner*—Jon Bradford Leaheey

*Attorney*—R. J. Guenther and William L. Keefauver

[57] ABSTRACT

Distortion of an acoustic signal caused by multipath transmission is minimized by utilizing a cepstrum technique. Signals received at a plurality of microphones are processed to obtain signal representations of their complex cepstrums. The cepstrum signals are then summed. In summing, the portions of the cepstrum signals representative of the undistorted acoustic signal cohere while the portions of the cepstrum signals representative of the multipath transmitted signals do not. Selective clipping of the summed cepstrum signal eliminates the distortion components. Inverse transformation of the clipped summed cepstrum signal yields a replica of the original acoustic signal.

11 Claims, 10 Drawing Figures

INVENTOR
J. L. FLANAGAN
BY C. E. Hirsch Jr.
ATTORNEY

CEPSTRUM OF UNDISTORTED COMPONENT OF SIGNAL FROM 103-1 (FIG. 1)

CEPSTRUM OF UNDISTORTED COMPONENT OF SIGNAL FROM 103-n (FIG. 1)

CEPSTRUM OF DISTORTED COMPONENT OF SIGNAL FROM 103-1

CEPSTRUM OF DISTORTED COMPONENT OF SIGNAL FROM 103-n

SUMMED CEPSTRUM

APPARATUS FOR REDUCING MULTIPATH DISTORTION OF SIGNALS UTILIZING CEPSTRUM TECHNIQUE

This invention relates to signal processing systems and, more particularly, to systems for minimizing distortion caused by multipath transmission of signals.

BACKGROUND OF THE INVENTION

Ordinarily, distortion results when a signal reaches a receiver or the like via a plurality of transmission paths. Such transmission of signals may occur, for example, in a room or on a sound stage. Specifically, distortion caused by multipath transmission is common in telephone conference and speakerphone systems which employ a microphone and speaker arrangement in place of the usual telephone handset. Multipath distortion in these and other systems seriously degrades the quality of speech signals.

Attempts have been made at minimizing multipath distortion in telephone conference and speakerphone systems. However, these attempts for the most part have not yielded the high quality speech signal desired.

In one attempt at reducing multipath distortion, the output signals of two or more spatially separate microphones were merely combined. Although it was believed that such a combination of signals minimized distortion, it has been found that such a combination of signals, in fact, aggravated the distortion.

In another attempt at minimizing distortion, signals received at a plurality of spatially separate microphones are divided into a plurality of frequency bands. Then the signal having maximum power in each band is selected. The maximum power signals are recombined to form a signal which hopefully contains less distortion than the original received signal. Although multipath distortion is somewhat reduced in this system, still higher quality speech signal reproduction is needed.

SUMMARY OF THE INVENTION

These and other problems are resolved in accordance with the principles of the invention herein to be described with reference to a system for minimizing multipath distortion of speech signals. Multipath distortion in a source signal, produced by acoustic reflections, is reduced by selectively processing signals received at each of a plurality of spatially separate receiving stations. Specifically, the received signals from each receiving station are selectively processed to obtain signals representative of the "complete," i.e. complex, cepstrum of the individual received signals. That is to say, a signal is generated which represents the "complete" Fourier transform, i.e., both magnitude and phase components, of the logarithm of the complete Fourier transform of each received signal. The individual complex cepstrum signals are then selectively combined in a predetermined manner, namely, by algebraic summing, so that those portions of the cepstrum signals representing undistorted components of the received acoustic signal "cohere" while the portions representing distorted components do not. Said another way, the undistorted components tend to add because the individual contributions to the cepstrum from each receiver station is the same, while the distorted components tend not to add because the individual contributions to the cepstrum are distributed, i.e., appear at different intervals. The combined complex cepstrum signal is selectively processed to suppress the distortion components. Inverse transformation of the processed combined complex cepstrum signal yields a "less distorted" version of the original source signal.

BRIEF DESCRIPTION OF THE DRAWING

These and other objects and advantage of the invention will be more fully understood from the following detailed description of an illustrative embodiment thereof taken in connection with the appended drawings in which.

DETAILED DESCRIPTION OF THE INVENTION

Figure 1:
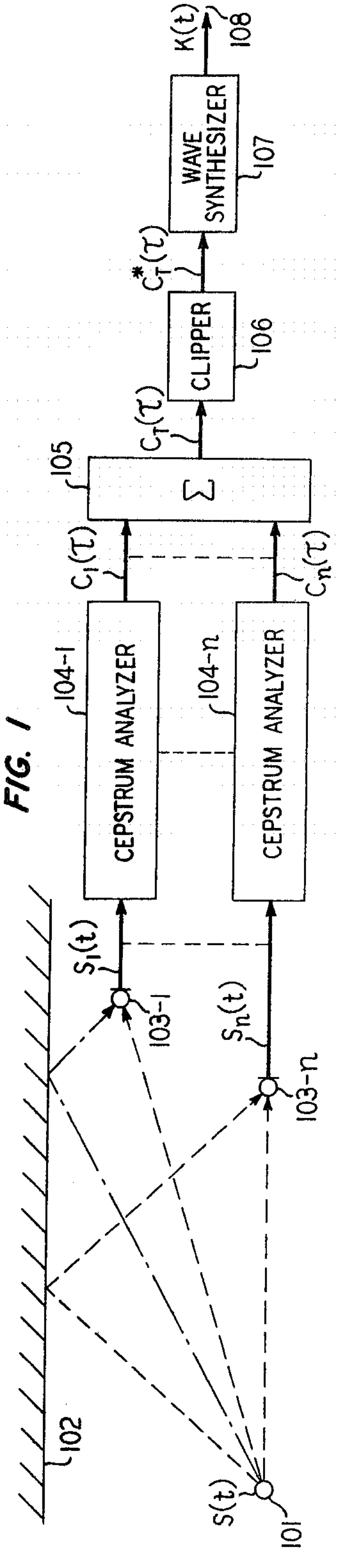
FIG. 1 shows in simplified block schematic form a system illustrating the invention.

FIG. 1 shows in simplified block form a system which, in accordance with the invention, selectively processes received signals to minimize multipath distortion therein. Signal source 101 produces a signal, for example, an acoustic wave represented by the function $S(t)$. Although $S(t)$ may be any form of acoustic signal, ordinarily, it is a complex speech signal. The acoustic signal detected at receiving stations 103–1 through **103–*n* contains both distorted components and undistorted components. Distortion of the received signal arises from the multipath transmission of source signal $S(t)$ caused by reflections and the like, for example, from wall 102**.

To eliminate multipath distortion, a plurality of spatially separate receiver stations, for example, stations 103–1 through **103–*n*, are utilized to detect acoustic signal S(t) emanating from source 101. In practice, it has been found that use of three to four selectively positioned microphones is sufficient for acceptable speech reproduction. Signals $S_1(t)$ through $S_n(t)$ generated at microphones 103–1 through 103–*n* are supplied to cepstrum analyzers 104–1 through 104–*n*, respectively. Cepstrum analyzers 104–1 through 104–*n*** generate signals representative of the "complex cepstrum" of the received acoustic signals, namely $C_1(\tau)$ through $C_n(\tau)$.

Cepstrum analysis of speech signals is now well known in the signal processing arts. Basic theoretical considerations relative to cepstrum analysis are discussed in an article by A. Michael Noll entitled "Cepstrum Pitch Determination" in *The Journal of the Acoustical Society of America*, Vol. 41, No. 2, 1967 at p. 293. The cepstrum signal processing technique involves obtaining a signal representative of the Fourier transform of the logarithm of the Fourier transform of a signal. In accordance with this invention, the "complete" or "complex" cepstrum is utilized so that the desired acoustic signal may be readily reconstructed. That is to say, both amplitude and phase components of the Fourier transformed received signals are processed to obtain the complex cepstrum signals.

Figure 2:
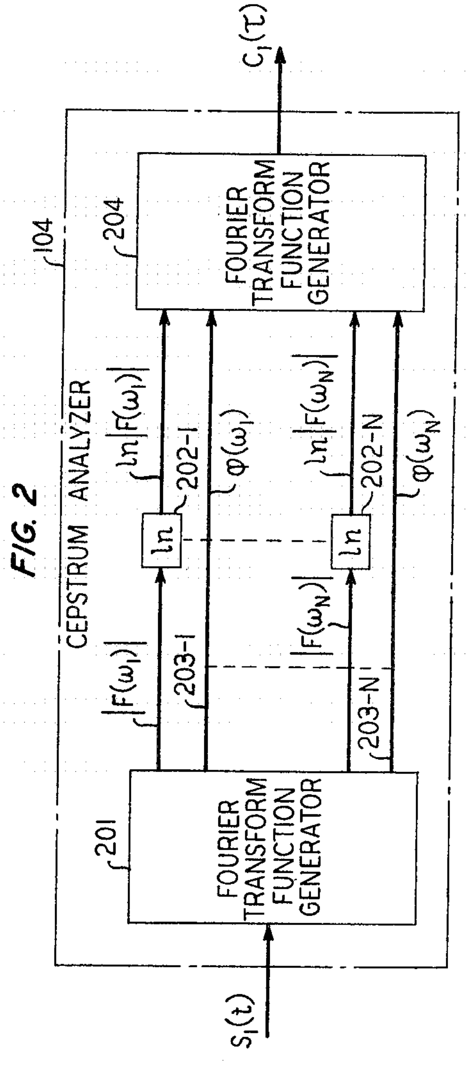
FIG. 2 depicts details of one embodiment of a cepstrum analyzer which may be utilized in the system of FIG. 1.

Referring briefly to FIG. 2, there is shown in simplified block form, apparatus which may be utilized in the practice of the invention for generating signals representative of the complex cepstrum of received speech signals. Accordingly, a received signal, for example $S_1(t)$, is supplied to Fourier transform function generator 201. Generator 201 may be any of the numerous apparatus known in the art for generating fast Fourier transforms (FFT). Such apparatus is described in an article entitled "The Time-saver; FFT Hardware," *Electronics*, June 24, 1968 at page 92. Additional apparatus capable of generating fast Fourier transforms are noted in an article entitled "Fast Fourier Transform Hardware Implementations — An Overview," *IEEE Transactions on Audio and Electroacoustics*, June 1969 at p. 104. Indeed, properly programed general purpose computers, for example, International Business Machine Model 360, General Electric Model 365 and the like, may equally well be utilized for this purpose.

In function generator 201 (FIG. 2), predetermined segments of received signal $S_1(t)$ are used to generate its Fourier transform. For example, segments $f_1(t)$ are obtained by weighting received signal $S_1(t)$ with a window function $W_1(t)$ such that $$f_1(t) = S_1(t) \cdot W(t) \qquad (1)$$

where $f_1(t)$ is a time function and $W(t)$ is the weighting function, preferably a "Hamming" window. That is to say, the Fourier transform of a segment of $S_1(t)$ seen through the Hamming window $W(t)$ is obtained and may be defined as $$F(w) = \int_{-\infty}^{\infty} f_1(t) e^{-jwt} dt \quad (2)$$

where $W$ is radian frequency, $j$ is $\sqrt{-1}$ and $t$ is time. Fourier transform $\mathcal{F}$ of $f_1(t)$ may also be expressed as $$\mathcal{F}[f_1(t)] \Rightarrow F_1(w) = |F_1(w)| e^{j\varphi_1(w)} \quad (3)$$

where $F_1(w)$ is the amplitude component and $\phi_1(w)$ is the corresponding phase component of the Fourier transform of $f_1(t)$. Taking the logarithm of the Fourier transform as expressed in Equation (3) yields $$\ln \mathcal{F}[f_1(t)] = \ln|F_1(w)| + j\varphi_1(w) \quad (4)$$

where $\varphi_1(W)$ represents the principal value of the phase function.

The complete or complex cepstrum is used in practicing this invention and is obtained by generating the Fourier transform of $\ln \mathcal{F}\,[f_1(t)]$ as expressed in Equation (4). Thus yielding $$C_1(\tau) = \mathcal{F}\{\ln|F_1(w)|\} + j\,\mathcal{F}\{\varphi_1(w) \quad (5)$$

Since $S_1(t)$ and $W(t)$ are real functions of time, $C_1(\tau)$ is also a real function of $\tau$.

Referring again to FIG. 2, $C_1(\tau)$ is generated by supplying magnitude components $|F_1(w_1)|$ through $|F_1(w_N)|$ of the Fourier transform of $S_1(t)$ via logarithm circuits 202–1 through 202–n, respectively, and the corresponding phase components $\phi_1(w_1)$ through $\phi_1(w_N)$ via circuit paths 203–1 through 203–N, respectively, to Fourier transform function generator 204, where signals representative of their Fourier transforms are generated. Fourier transform function generator 204 is identical in construction to generator 201 and any of the apparatus noted above regarding generator 201 may be equally well employed in generator 204.

In operation, cepstrum analyzers 104 process the received signals substantially in "real" time. This is possible because the received signals need only be sampled at predetermined intervals for generating their cepstrum. In practice, sampling intervals of 10 milliseconds have been satisfactorily employed. Generation of Fourier transforms of a received signal in less than 10 milliseconds is well within the capability of existing apparatus for generating fast Fourier transforms.

Figure 6A:
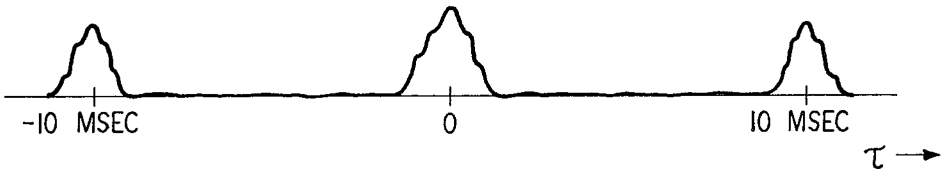
FIGS. 6A through 6E show waveforms useful in describing the operation of the invention.
Figure 6B:
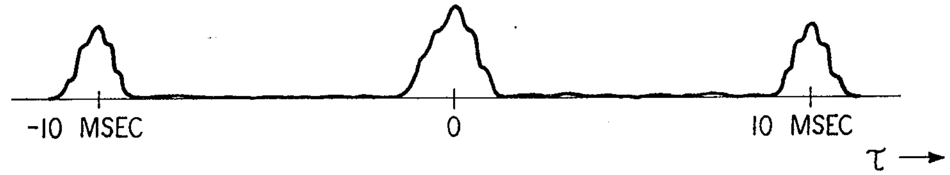
Figure 6C:
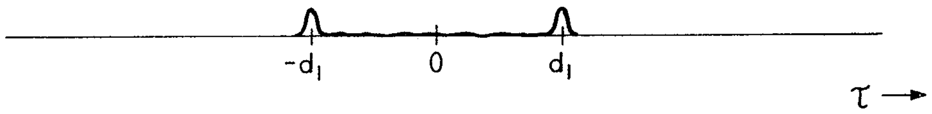
Figure 6D:
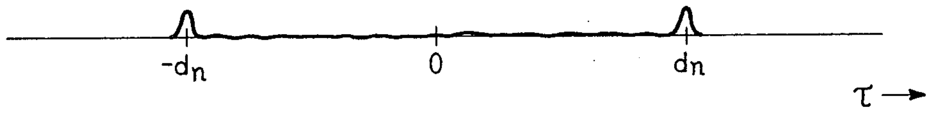
Figure 6E:
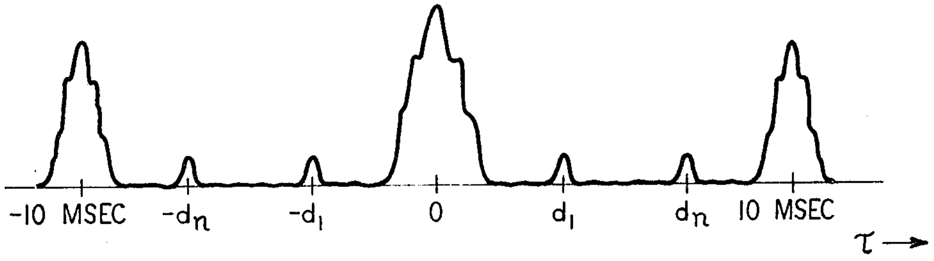

Individual cepstrum signals $C_1(\tau)$ through $C_n(\tau)$ are combined in summing circuit 105 (FIG. 1). As noted above, the individual cepstrum signals include undistorted components and multipath distorted components. In summing, the undistorted components "cohere," while the distorted components tend not to add. Consider a simple example. Assume that signal $S(t)$ emanating from source 101 (FIG. 1) is a periodic vowel sound having a pitch of 100 Hz and that the signal received at each of microphones 103–1 through 103–n includes only a direct sound component (undistorted) and one echo of undiminished amplitude (distorted component) having a delay $d$. Delay $d$ is the general difference in the echo signal at each microphone and is typically in the range of 1 to 10 milliseconds (msec.). Thus, for $n$ microphones there are $d_n$ individual delays. In cepstrum analyzing the individual received signals, a "constant shaped" function representative of the undistorted components is generated as depicted in FIGS. 6A and 6B while a "single" peak is generated for each of the distorted components at their corresponding delay intervals, i.e., at $d_1, \ldots d_n$, as depicted in FIGS. 6C and 6D. Since the peaks representing the distortion components are at different or "random" intervals, they do not cohere when summed but since the undistorted components contribute similarly to each cepstrum, they "cohere" when summed, thereby adding to an amplitude significantly greater than that of the distortion components. Thus, summing circuit 105 yields a summed complex cepstrum signal, $C_T(\tau)$, as shown in FIG. 6E.

It can be shown that if $f_1(t)$, as expressed in Equation (1), through $f_n(t)$ are real functions of time $(t)$ and causal functions, which they always must be in the practice of this invention, then the complex cepstrum may be expressed $$C(\tau) = \int \ln|F(w)| \cos w\tau dw + \int \varphi(w) \sin w\tau dw \quad (6)$$

wherein $C(\tau)$ is a real function of $\tau$. Additionally, if $f_1(t)$ through $f_n(t)$ are "minimum phase" functions, then $C(\tau)$ is also a casual function. Thus, inverse transformation of the complex summed cepstrum signal is achieved by processing, in well-known fashion, a real function of $\tau$. When $C(\tau)$ is casual, i.e., minimum phase, only a positive function of $\tau$ need be processed.

Summed cepstrum signal $C_T(\tau)$ is supplied to clipper 106 (FIG. 1) where it is selectively processed to eliminate the distortion components. Although numerous techniques may be utilized to eliminate the distortion components from summed cepstrum signal $C_T(\tau)$, in practice, it is preferred that center clipping be utilized. Typically, clipper 106 has a predetermined characteristic which allows the summed undistorted components of $C_T(\tau)$ to pass unsuppressed while suppressing the random distorted components. Accordingly, clipper 106 yields a processed complex summed cepstrum signal, $C_T(\tau)$.

Processed complex cepstrum signal $C_T^*(\tau)$ is supplied to wave synthesizer 107 wherein it is inverse transformed to yield at point 108 a replica of original source signal $S(t)$, namely $K(t)$, which may be utilized as desired.

Figure 4:
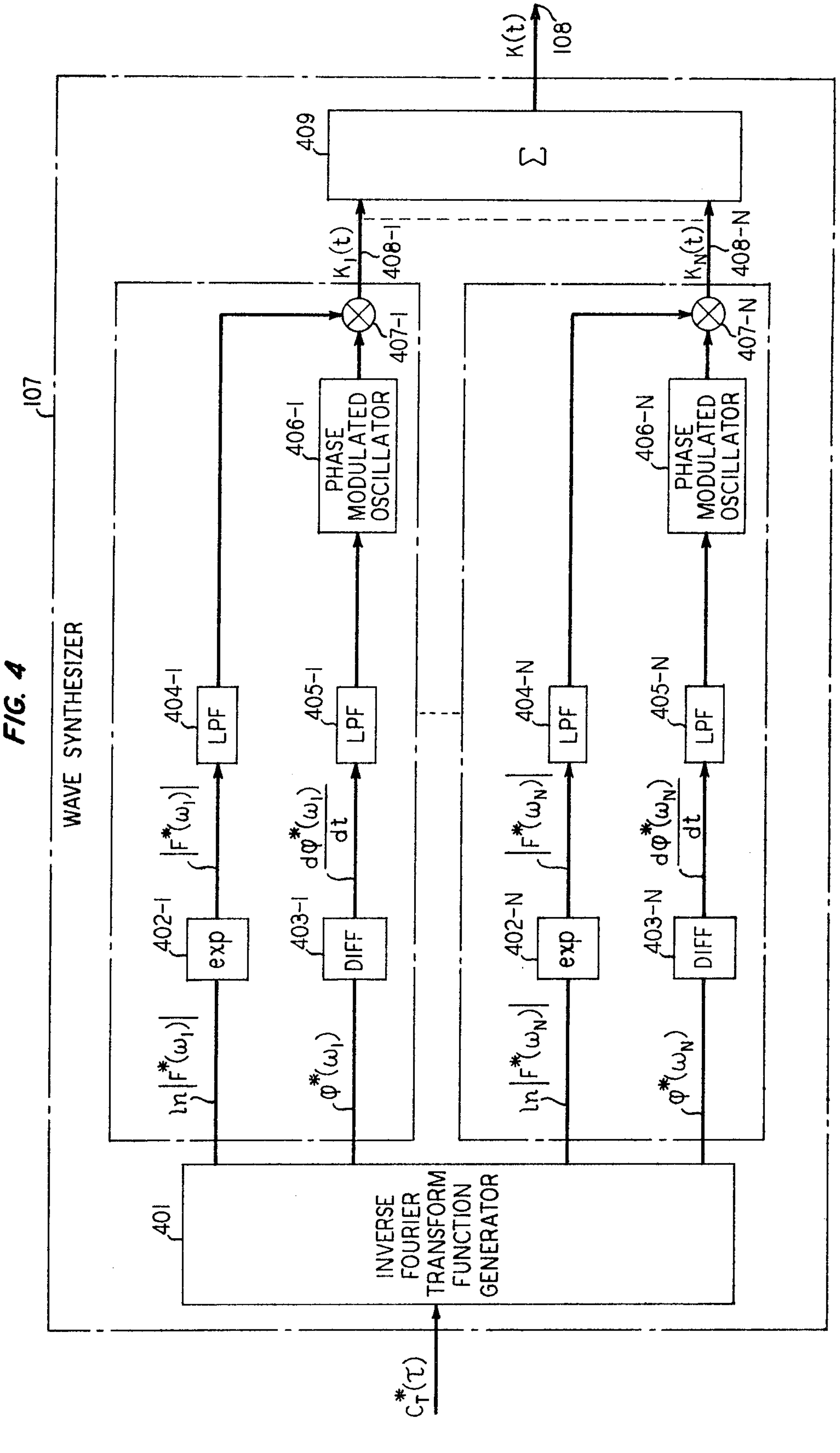
FIG. 4 shows details of one embodiment of a wave synthesizer which may be used in the system of FIG. 1.

FIG. 4 shows details of one wave synthesizer which may be utilized in the practice of this invention. Signal $C_T^*(\tau)$, which is a real function, is supplied to inverse Fourier transform function generator 401 wherein it is inverse transformed in well-known fashion to yield a plurality of signal pairs representative of the logarithm of the amplitude components of the Fourier transform of the desired replica signal $K(t)$ and their corresponding phase components, namely $|F^*(w_1)|$, $\phi^*(w_1)$; ... $|F^*(w_N)|$, $\phi^*(w_N)$, where $w_1$ through $w_N$ represent fixed frequencies corresponding to those used in obtaining the cepstrums. Inverse Fourier transform function generator 401 may be any of the numerous units known in the art capable of generating fast Fourier transforms. Many such generators are known in the art as noted above in connection with Fourier transform function generators 201 and 204 (FIG. 2) and will not be discussed in detail. In practice, processed cepstrum signal $C_T^*(\tau)$ is inverse transformed as any aperiodic wave would be. This is possible because $C_T^*(\tau)$ is a real function of $\tau$ and may be causal if $S(t)$ is a minimum phase function. "Real-time" inverse transformation of the complex cepstra signal is possible since the summed cepstrum signal need only be sampled at predetermined periodic intervals. Typically, inverse Fourier transforms are needed every 10 milliseconds for acceptable quality reproduction of the source signal. This is well within the capabilities of existing fast Fourier transform apparatus.

In practice N signals (typically $N = 60$) representative of inverse Fourier transforms of $C_T^*(\tau)$ are generated in inverse function generator 401, namely, $\ln |F^*(w_1)|$, $\phi^*(w_1)$, ... $\ln |F^*(w_{60})|$, $\phi^*(w_{60})$. Each of the $\ln |F^*(w)|$ components is supplied to an exponentiating network 402 which yields an amplitude component of the Fourier transform, $|F^*(w)|$, of the desired replica of the source signal. The corresponding phase components, $\phi^*(w)$, are each supplied to differentiators 403 to obtain their time derivatives, $d\phi^*w)/dt$. $\phi^*)(w)$ could be used directly in reconstructing a replica of the source signal. However, in processing, $\phi^*(w)$ is caused to have undesirable discontinuities and is not band-limited in character. The derivative of $\phi^*(w)$ is used because it is band-limited and therefore can be bow pass filtered to eliminate the discontinuities. Additionally, both $|F^*(w)|$ and $d\phi^*(w)/db$ are sample signals which must be filtered to obtain interpolation between the samples and to provide a continuous function. Accordingly, signal samples representing $|F^*(w)|$ and $d\phi^*(w)/dt$ are passed through low-pass filters 404 and 405, respectively, to generate continuous signal functions.

It can be shown that components $|F^*(w)|$ and $d\phi^*(w)/dt$ adequately specify a corresponding component of $K(t)$. For example, control signals $|F^*(w_1)|$ and $d\phi^*(w_1)/dt$define $K_1(t)$, . . . $|F^*(w_N)|$ and $d\phi^*(w_N)/dt$ define $K_N(t)$, where $K(t)$ equals the sum of $K_1(t) \ldots K_N(t)$. That is, $$K(t)=\sum_{n=1}^{N} K_n(t)=\sum_{n=1}^{N} |F^*(w_n)| \cos [(w_n t+\varphi^*(w_n)] \quad (7)$$

where $|F^*(w_n)|$ constitutes the *n*th term of the series, and where $\phi^*(w_n)$ constitutes the corresponding phase modulation. Thus, each of *n* segments are obtained by modulating a signal having frequency $w_n$ with phase $\phi^*(w_n)$. This is expressed $$K_n(t)=|F^*(w_n)| \cos [w_n t+\varphi^*(w_n)] \quad (8)$$

which may be expressed $$K_n(t)=|F^*(w_n)| \cos \left[w_n t+\int^t \varphi^*(w_n)\,dt\right] \quad (9)$$

A more complete analysis concerning these considerations including a detailed theoretical discussion is found in my U.S. Pat. No. 3,360,610, issued Dec. 26, 1967.

Thus, N pairs of control signals $|F^*(w)|$ and $\phi^*(w)$ are utilized to generate components of signal $K(t)$. Accordingly, phase derivative control signals $d\phi^*(w_1)/dt$ through $d\phi^*(w_N)/dt$ (FIG. 4) are supplied to phase modulated oscillators 406-1 through 406-N, respectively. Oscillators 406 may be any conventional design for producing a cosine wave at fixed frequencies, namely $w_1$ through $w_N$, which are modulated by the phase derivative control signals to generate cosine waves having an argument $$\left[wt+\int^t \varphi^*(w)\,dt\right]$$

Figure 5:
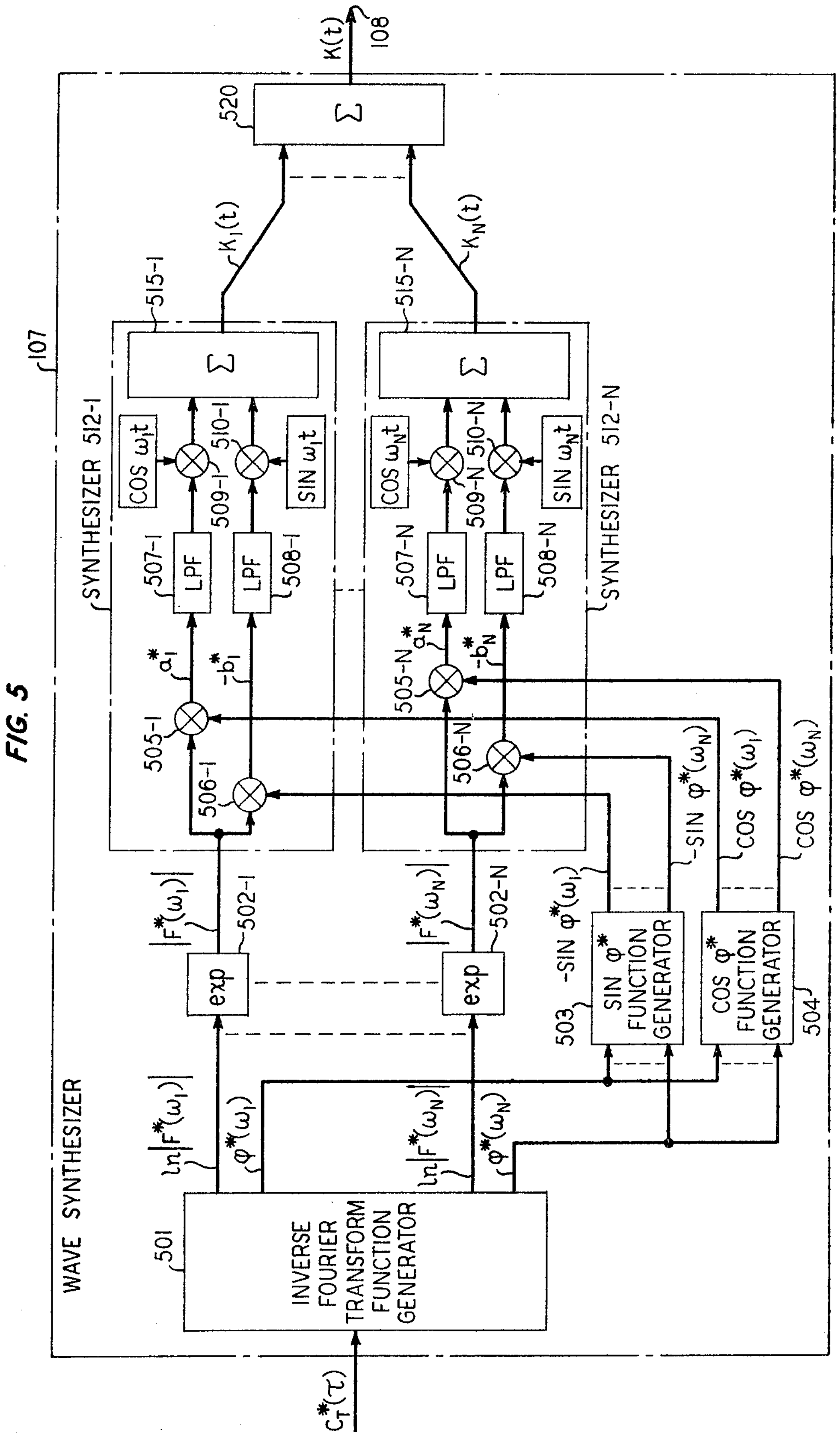
FIG. 5 depicts another wave synthesizer which may be employed in the practice of the invention.

The phase modulated signals are supplied to multipliers 407 where they are multiplied with the corresponding amplitude control signal to yield signals $K_1(t) \ldots K_N(t)$. Signals $K_1(t) \ldots K_N(t)$ are then summed in adder 409 to yield a replica of source signal $S(t)$, namely, $K(t)$ at point 108. FIG. 5 shows details of a second wave synthesizer which may be utilized in the practice of this invention and will be discussed below.

Figure 3:
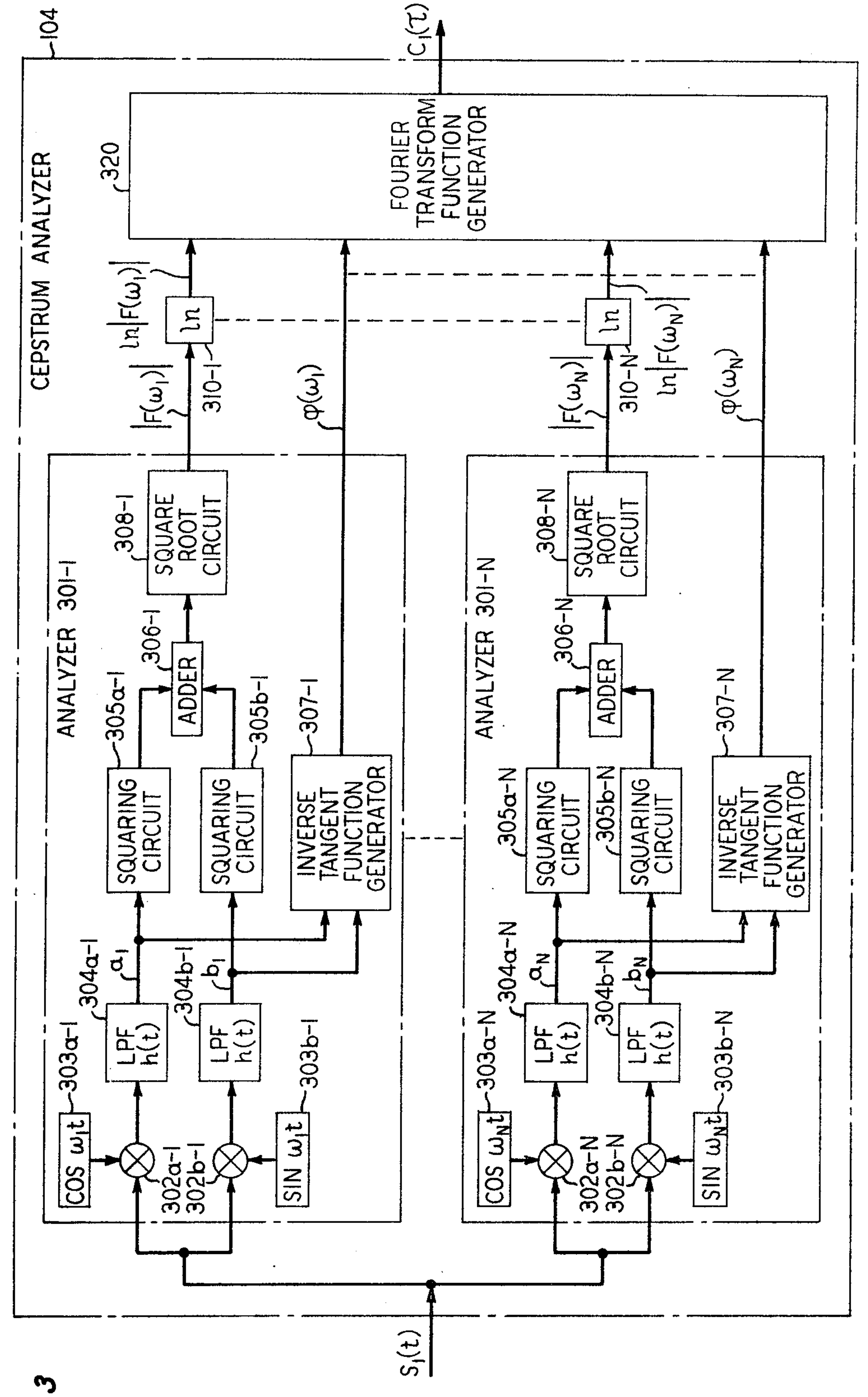
FIG. 3 illustrates details of another cepstrum analyzer which may be used in the practice of the invention.

FIG. 3 shows details of a second cepstrum analyzer which may be used in the practice of the invention. Accordingly, received signal $S_1(t)$ is supplied to analyzers 301-1 through 301-N of cepstrum analyzers 104 to obtain signals representative of the Fourier transform of $S_1(t)$.

It can be shown, that the Fourier transform, $F(w_n)$, of $S_1(t)$ may be expressed in terms of cosine and sine transforms $$F(w_n)=|F(w_n)|e^{j\varphi(w_n)}=\int_{-\infty}^{t} S_1(\lambda)h(t-\lambda) \cos w_n\lambda\, d\lambda - j\int_{-\infty}^{t} S_1(\lambda)h(t-\lambda) \sin w_n\lambda\, d\lambda \quad (10)$$

which may be expressed $$F(w_n)=a_n-jb_n, \quad (11)$$

where $a_n$ and $b_n$ are the real and imaginary components of $F(w_n)$. Therefore, $|F(w_n)|$ and $\phi(w_n)$ are determined as follows:

$$|F(w_n)|=(a_n^2+b_n^2)^{1/2} \quad (12)$$

and $$\varphi(w_n)=\tan^{-1}\frac{b_n}{a_n} \quad (13)$$

A more detailed discussion of the above analysis may be found in my U.S. Pat. No. 3,360,610 cited above.

Referring again to FIG. 3, signals representative of the $a_n$ and $b_n$ functions, for example, $a_1$ and $b_1$, are generated by first supplying $S_1(t)$ to multipliers **302*a*-1 and 302*b*-1. In accordance with equation (10 ), multiplier 302*a* 1 is also supplied with a fixed frequency cosine signal, cos $w_1 t$, from cosine generator 303*a*-1, and multiplier 302*b*-1 is supplied with a fixed frequency sine signal, sin $w_1 t$, from sine generator 303*b*-1. Similarly, $S_1(t)$ is combined with cosine and sine signals in the remaining (N-1) analyzers. Frequencies $w_1$ through $w_N$ of the sine and cosine signals are selected to be spaced at predetermined intervals to obtain a desired number of Fourier coefficients. For example, for a speech signal having a bandwidth of 3,000 Hz, it may be desired to have $n = 60$ samples. Thus, frequencies $w_1$ through $w_N$ would be centered at 50 Hz intervals beginning with $w_1$ fixed at 25 Hz and ending with $w_{60}$ fixed at 2,975 Hz. The product signals developed by multipliers 302*a*-1 and 302*b*-1 are supplied to low-pass filters 304*a* and 304*b*-1. Filters 304*a* and 304*b*** have identical impulse responses $h(t)$ so that their output signals correspond to the terms $a_n$ and $b_n$ of Equation (12).

In analyzer 301-1 signals representative of $a_1$ and $b_1$ are supplied to squaring circuits **305*a*-1 and 305*b*-1, respectively, and to inverse tangent function generator 307-1. Signals developed in squaring circuits 305*a*-1 and 305*b*-1 representing $a_1^2$ and $b_1^2$ respectively, are combined in adder 306-1. The output signal from adder 306-1 is supplied to square root circuit 308-1, which output in turn represents the amplitude of the Fourier transform taken at frequency $w_1$ as defined in Equation (12), namely, $|F(w_1)|$ . The output signal developed by inverse tangent function generator 307-1 represents the corresponding phase component of the Fourier transform taken at frequency $w_1$ as defined in equation (12), namely, $\phi(w_1)$. Similarly, (N-1) additional amplitude and phase components taken at frequencies $w_2$ through $w_N$ are generated in analyzers 301-2 (not shown) through 301-N, respectively. Amplitude components $|F(w_1)|$ through $|F(w_N)|$ are supplied via logarithm circuits 310-1 through 310-N, along with their corresponding phase components $\phi(w_1)$ through $\phi(w_N)$ to Fourier transform function generator 320 where their Fourier transform is taken. The output of generator 320 is representative of the complex cepstrum of $S_1(t)$, namely, $C_1(\tau)$. Fourier transform function generator 320 is identical to generators 201 and 204 described in conjunction with the cepstrum analyzer depicted in FIG. 2** and will not be further discussed here.

FIG. 5 depicts a second wave synthesizer which may e employed in the practice of this invention. Accordingly, complex cepstra signal $C_T^*(\tau)$ is supplied to inverse Fourier transform function generator 501 wherein a plurality of signal pairs representative of 1n $|F^*(w_1)|$ , $\phi^*(w_1)$, through 1n $|F^*(w_N)|$ , $\phi^*(w_N$ are generated. Inverse Fourier transform function generator 501 is identical in construction to generator 401 discussed above in conjunction with FIG. 4 and will not be discussed in detail. Signals **1*n*** $|F^*(w_1)|$ through **1*n*** $|F^*(w_N)|$ are supplied to exponentiating circuits 502-1 through 502-N. The output signals developed in circuits 502 represent the amplitude component of the Fourier transform of a segment of the desired reconstructed signal, $K(t)$. For example, $|F^*(w_1)|$ represents the amplitude of the Fourier transform of $K(t)$ taken at frequency $w_1$. Signal $\phi(w_1)$ represents the corresponding phase component of the Fourier transform of $K( t)$ taken at frequency $w_1$.

It can be shown that $$a_n^* = |F^*(w_n)| \cos \phi^*(w_n) \text{ and} \quad (14)$$

$$b_n^* = |F^*(w_n)| \sin \phi^*(w_n). \quad (15)$$

It can also be shown that $$K_n(t) = a^*_n \cos w_n t - b^*_n \sin w_n t. \quad (16)$$

Therefore, N segments of the desired minimum phase replica of $S(t)$, namely $K(t)$, are generated by selectively processing the amplitude and phase components $|F^*(w_n)|$ and $\phi^*(w_n$. $|F^*(w_n)|$ and $\phi^*(w_n)$ are "samples" which are typically obtained at a 100 Hz rate, i.e., every 10 msec. Phase components $\phi^*(w_1)$ through $\phi^*(w_N)$ are supplied to sine function generator 503 and cosine function generator 504 wherein signals representative of their corresponding sine and cosine functions are generated. Then a segment of $K(t)$, for example $K_1(t)$, is generated by supplying $|F^*(w_1)|$ to multipliers 505–1 and 506–1. In accordance with equation (14) multiplier 505–1 is also supplied with a signal representative of cos $\phi^*(w_1$ and in accordance with Equation (15), multiplier 506–1 is supplied with a signal representative of $-\sin \phi(w_1)$. The output of multiplier 505– 1 represents the function of $a^*_1$. Since $a^*_1$ is a sample signal, interpolation is required between the individual sample bits. This is achieved by supplying $a^*_1$ to filter 507–1 wherein $a^*_1$ is converted from a sample signal to a continuous signal. In accordance with Equation (15), multiplier 509–1 is supplied with $a^*_1$ and with a cosine signal at predetermined frequency $w_1$. The output signal of multiplier 506–1 represents the function $b^*_1$ which is also a sample signal. Accordingly, $b^*_1$ is supplied to low-pass filter 508–1 which provides interpolation between the samples and smooths signal $b^*_1$ into a continuous signal. In accordance with Equation (16), multiplier 510–1 is supplied with the output from filter 508–1, namely, $b^*_1$, and with a sine signal at predetermined frequency $w_1$. The output signals developed by multipliers 509–1 and 510–1 are combined in adder 515–1 which yields segment $K_1(t)$ of $K(t)$. Similarly, (N–1) additional segments, i.e., $K_2(t)$ (not shown), . . . $K_N(t)$, of $K(t)$ are generated in synthesizers 512–2 (not shown) through 512–N.

Signals $K_1(t)$ through $K_N(t)$ are combined in adder 520 to yield at point 108 replica $K(t)$ of original source signal $S(t)$.

What is claimed is:

1. Signal processing apparatus which comprises
   - means for receiving signals at each of a plurality of spatially separated locations, said received signals being emitted from a source and being characterized by distorted components and undistorted components,
   - means in circuit relationship with said receiving means for generating signals representative of the cepstrum of each of said received signals,
   - processing means supplied with said cepstrum signals for eliminating the distortion components therefrom, and
   - synthesizer means responsive to said processed cepstrum signals for generating a replica of the signal emanating from said source.

2. Apparatus as defined in claim 1 wherein said cepstrum signal generating means includes a plurality of cepstrum analyzers in a one-to-one relationship with said receiving locations.

3. Apparatus as defined in claim 1 wherein said synthesizer means includes means for inverse cepstrum transforming said processed cepstrum signals.

4. Apparatus as defined in claim 1 wherein said processing means includes means for selectively algebraically combining said cepstrum signals, and means for suppressing selected portions of said combined cepstrum signals.

5. Apparatus as defined in claim 4 wherein said combining means is an added and said suppressing means is a center clipper.

6. Apparatus for reducing multipath distortion in an acoustic signal which comprises,
   - a plurality of transducers located in spatially separate relation to one another receiving signals emanating from a source,
   - means in a one-to-one relationship with said transducers for generating signals representative of the complex cepstrum of each of the signals generated by said transducers,
   - means for selectively combining said complex cepstrum signals,
   - means for processing said combined signals to suppress selected portions thereof, and
   - synthesizer means responsive to said processed signals for generating a replica of the signal emanating from said source.

7. Apparatus as defined in claim 6 wherein said combining means includes means for algebraically summing said complex cepstrum signals.

8. Apparatus as defined in claim 7 wherein said processing means includes a center clipper having a predetermined characteristic so that distorted components of said combined complex cepstrum signals are suppressed and undistorted components are not suppressed.

9. Apparatus as defined in claim 8 wherein said synthesizing means includes means for inverse cepstrum transforming said processed signal.

10. Apparatus as defined in claim 9 wherein said inverse cepstrum transformation means includes
    - means supplied with said processed signal for generating a plurality of first signals each representative of the logarithm of the amplitude component of the Fourier transform of a segment of said replica signal and for generating a plurality of second signals each representative of the corresponding phase component of the Fourier transform of a segment of said replica signal,
    - means supplied with said first signals for generating a corresponding plurality of signals each representative of the amplitude spectrum of a segment of said replica signal,
    - means supplied with said second signals for generating signals representative of the time derivative of each of said second signals,
    - a plurality of oscillator means responsive in a one-to-one relationship to said differentiated second signals for generating a plurality of phase modulated cosine signals each representative of the phase spectrum of a segment of said replica signal,
    - a plurality of multiplier means in a one-to-one relationship with said oscillator means, each of said multipliers being supplied with the phase spectrum signal and the amplitude spectrum signal for a segment of said replica signal, and
    - means for summing the individual signals developed by said plurality of multiplier means, thereby yielding said replica signal.

11. A method for minimizing multipath distortion in an acoustic signal comprising the steps of
    - analyzing signals emanating from a source and received at a plurality of receiving stations to obtain representations of the individual cepstrums of said received signals, said cepstrums being characterized by distortion components and nondistortion components,
    - summing said cepstrum representations,
    - processing said summed cepstrum representations selectively to eliminate said distortion components therefrom, and
    - further processing of said previously processed representations by inverse cepstrum transforming thereby to synthesize a replica of said source signal.

* * * * *